C. W. SVENSON.
CAST-OFF DEVICE FOR RECORDERS.
APPLICATION FILED AUG. 1, 1913.
1,130,119.
Patented Mar. 2, 1915.
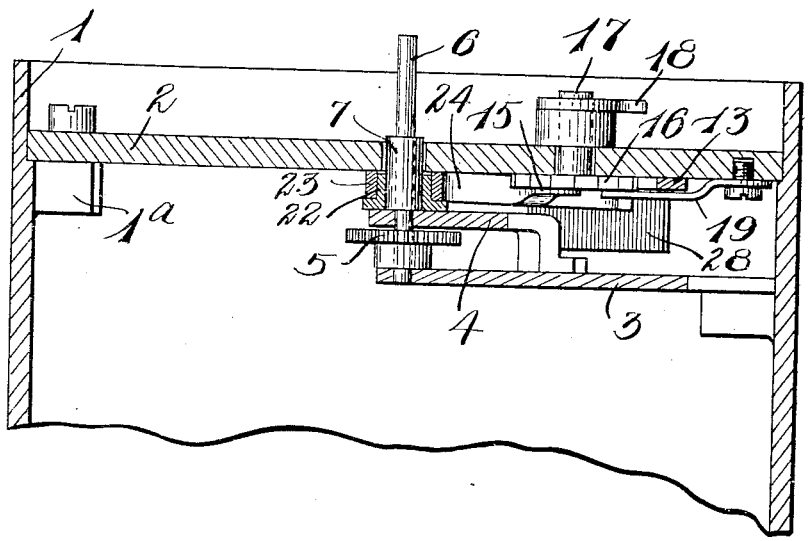
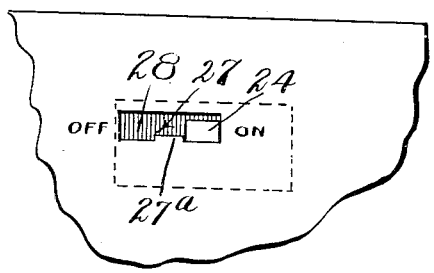

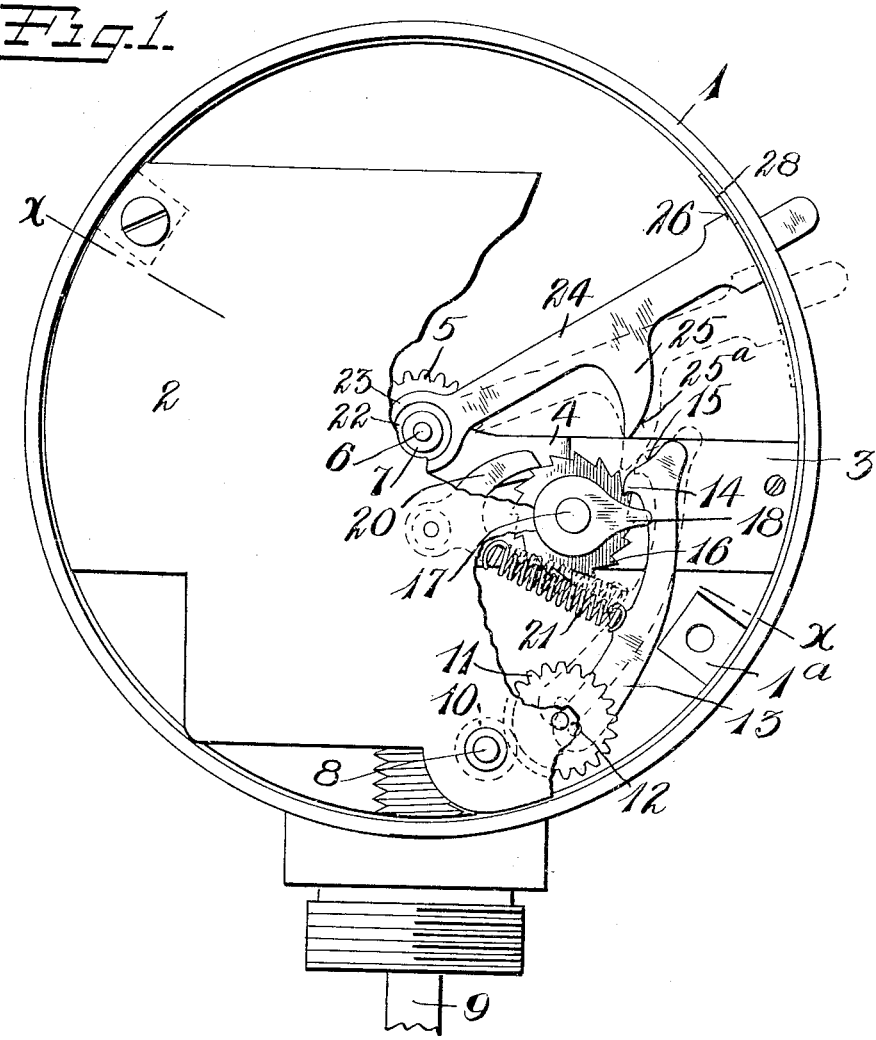

ated herein.  
UNITED STATES PATENT OFFICE.

CHARLES WALFRID SVENSON, OF NEW BRITAIN, CONNECTICUT, ASSIGNOR TO THE AMERICAN HARDWARE CORPORATION, OF NEW BRITAIN, CONNECTICUT, A CORPORATION OF CONNECTICUT.

CAST-OFF DEVICE FOR RECORDERS.

1,130,119. Specification of Letters Patent. Patented Mar. 2, 1915.

Application filed August 1, 1913. Serial No. 782,420.

*To all whom it may concern:*

Be it known that I, CHARLES W. SVENSON, a citizen of the United States, residing at New Britain, county of Hartford, State of Connecticut, have invented certain new and useful Improvements in Cast-Off Devices for Recorders, of which the following is a full, clear, and exact description.

This invention relates to a cast-off device for gearing, and particularly to such a device as applied to a speedometer, wherein gearing for speed indicating mechanism and gearing for distance registering mechanisms are embodied in connection with a common driving shaft, the actuating gearing of each of these mechanisms being separate. It is particularly desirable, when such a speedometer is used in connection with a motor cycle, to provide means whereby when the engine is being tuned up, the speed may be indicated, but the distance registering mechanism placed out of operation without effecting the operation of the speed registering mechanism.

My invention provides means whereby this may be accomplished, and at the same time provides an advantageous and desirable form of cast-off device for actuating mechanism. These and other advantages will be more fully apparent from the detailed specification following, taken in connection with the accompanying drawings forming part thereof and illustrating a preferable embodiment of the invention in connection with a standard type of "speedometer."

In these drawings: Figure 1 is a top plan view of such a speedometer, the dial face being removed and the plate carrying the odometer or distance registering mechanism, being broken away to disclose the actuating gearing and cast-off therebeneath, and the numeral disks of the odometer mechanism being omitted. Fig. 2 is a vertical section taken on the line x—x of Fig. 1. Fig. 3 is a fragmentary view in side elevation of the speedometer casing showing the cast-off lever and its slot.

Referring to the drawings by numerals, 1 indicates a speedometer casing, within which are provided one or more supporting lugs 1ª, to which the frame 2 of the odometer or distance registering mechanism is appropriately secured.

3 indicates a plate carried by and within the casing and below the frame 2, which plate is provided on its upper face with a bracket 4.

5 indicates a gear wheel of the speed registering gearing, which gear is appropriately mounted on the plate 3 below the bracket 4, and has its spindle 6 extending up through said bracket and through a suitable aperture in the frame 2, a bushing 7 being provided for the shaft and this bushing extending through the frame 2 and being supported by the bracket 4.

8 indicates a spindle suitably driven from a drive shaft 9, by which the registering gear 5 is also driven by appropriate connecting means. The spindle drive and speed gearing are of the standard type now on the market and need not be further described herein, as their general operation is familiar to those skilled in the art. The driven spindle 8 carries a gear wheel 10 which meshes with a second gear wheel 11, mounted on the under face of the frame 2, and carrying an eccentric pin 12. Journaled on this eccentric pin is one end of a driving dog 13, for the distance registering gearing. This driving dog is provided adjacent its outer end with a tooth 14 and with a rounded nose 15 extending forwardly thereof, for the purpose to be hereinafter described. This driving dog normally engages its toothed end with the teeth of a ratchet wheel 16, journaled in the frame 2 at the under side thereof, and having its spindle 17 extending up through the frame and carrying a cam 18, which cam is designed to operate the unit gear wheel or gear wheels of the distance indicating disks. A bracket 19 is preferably secured to the under face of the frame 2, and extends transversely of and over the driving dog 13 to protect the same. A pivoted pawl 20 is provided for the ratchet wheel 16, this pawl being normally held in engagement with the teeth of this ratchet wheel, by means of a coiled spring 21, which spring is likewise secured to the driving dog 13, and normally tends to hold said dog against the toothed edge of the ratchet wheel.

It is hardly necessary to describe the operation of the speed and distance registering mechanisms in detail. Suffice it to say, that the indicating hand (not shown) for the speed registering scale, is carried by the spindle 6, and this spindle is rotated through gear 5 and its connections to drive shaft 9 to register the speed of the vehicle, the drive shaft 9 being connected usually by a flexible shaft to gearing carried by one of the wheels of the vehicle. The driven spindle 8 through its connection with the common drive shaft 9, operates the gears 10—11, and through the eccentric pin 12 reciprocates the driving dog 13 to turn the ratchet wheel a predetermined distance with each reciprocation. The ratchet wheel 16 and its driving dog 13 form part of the distance registering gearing, and are independent of the speed registering gearing. Rotation of the ratchet wheel 16 may be stopped, therefore, without interfering with the continued operation of the speed registering mechanism, provided, of course, the reciprocation of the driving dog 13 is not interfered with, as this is connected with and operated by the common driving shaft 9 for gearing of both the speed and distance mechanisms.

In order to prevent the operation of the distance registering mechanism without interfering with the continuous operation of the speed registering mechanism, I have devised the following means: Seated on the upper face of the bracket 4, and about the sleeve 7 of the speed indicating spindle, is a flanged collar 22, whose upper edge terminates below the under face of the frame 2. Journaled on this collar, and resting on its flange, is the hub end 23 of a cast-off lever 24. The thickness of this hub end is such, that when journaled on the collar 22, and after the odometer frame 2 has been secured to the lugs 1$^a$ of the casing, the under face of the frame 2 will press against the upper edge of this hub end 23, to exert pressure thereon for the purposes hereinafter seen. The cast-off lever 24 intermediate its ends, is provided with a transversely extending arm 25, in the form of a tooth having a rounded edge 25$^a$ designed to coöperate with the nose 15 of the driving dog 13. The lever 24 adjacent its outer end is shouldered down as at 26, and extends outwardly through a slot 27 formed in the casing 1. A shield 28 of sufficient size to cover the slot at all times is carried by this cast-off lever, and rests against the shoulder 26 thereof, and against the inner face of the casing 1. The casing at the lower edge of the slot 27 is provided with a centrally located raised portion 27$^a$. As I have before stated, the hub end of the cast-off lever is held down by the pressure of the odometer frame 2. This pressure normally tends to hold the outer end of this lever pressed against the lower edge of slot 27, the slot being of greater width than the thickness of the lever. The transverse arm 25 of this lever is positioned so that when the outer end of the lever is moved from one end of the slot 27 to its other end, the rounded edge 25$^a$ of the arm will engage with the nose 15 of dog 13 to move the same slightly outwardly against the tension of spring 21, so that as the dog 13 reciprocates, it is guided in a plane of movement out of its line of engagement with the teeth of the ratchet wheel 16, so that it may reciprocate with the rotation of the drive shaft 9, but will not operate the registering mechanism. To shift the outer end of the cast-off lever from one end of the slot 27 to the other, this end of the lever is sprung upwardly and raised over the central enlarged portion 27$^a$ to the end of the slot, whereupon the tension exerted against the hub end of this lever will force its outer end downwardly, to engage the lower edge of the slot 27, and will serve to hold it there against accidental movement until the outer end thereof is again actuated as before described and in a reverse direction, to withdraw the arm 25 of the lever from engagement with the nose 15 of driving dog 13. This reverse movement of the cast-off, will permit the dog 13 to again engage the teeth of ratchet 16 and operate the registering mechanism. It will be seen, therefore, that the operation of this cast-off lever will serve to cut out the gearing of the distance registering mechanism at will. The advantage of this will be obvious, especially in connection with a speedometer applied to a motor cycle and need not be further enlarged upon herein. I desire it understood, however, that while I have herein shown and described a specific embodiment of gearing for registering mechanism and cast-off therefor, the invention is not limited to the specific constructions shown, but may be varied in structure and relative arrangement of parts within the spirit of the invention and the scope of the appended claims.

What I claim is:

1. In a device of the character described, in combination, two separate gearing mechanisms, a common driving shaft for said mechanisms, one of said mechanisms including a rotatable gear element and a reciprocating actuator normally positioned to engage and rotate said element, and itself driven from said common shaft, and a manually controlled cast-off member arranged to be moved to engage said actuator to move the same from the line of its coöperating gear element and to guide the same in a path of reciprocation out of the line of engagement with said gear element, while permitting the continued reciprocation of said actuator.

2. In a device of the character described, in combination, two separate gearing mechanisms, a common driving shaft for said mechanisms, one of said mechanisms including a ratchet wheel and a reciprocating driving dog arranged and normally tending to engage and rotate said ratchet wheel, said driving dog itself being driven from said common shaft, and a manually controlled cast-off arm arranged to be moved to and held in a position to engage and guide said dog in a plane of reciprocation out of the line of engagement with said ratchet wheel, while permitting the continued reciprocation of said driving dog.

3. In a device of the character described, two separate gearing mechanisms, a common driving shaft for said mechanisms, one of said mechanisms including a ratchet wheel and a reciprocating driving dog therefor, said dog being operated from said common driving shaft and being arranged and normally tending to engage and rotate said ratchet wheel, a manually controlled arm arranged to be moved toward and from a position whereby it engages said driving dog and moves it out of the line of said ratchet wheel to guide said dog in a plane of reciprocation out of the line of ratchet wheel engagement, while permitting the continued reciprocation of said dog, with means arranged to retain said arm when moved into dog controlling and non-controlling positions.

4. In a device of the character described, in combination, a casing, a driving shaft extending within said casing, two separate gearing mechanisms within said casing and in operative and independent connection with said shaft, one of said gearing mechanisms embodying a reciprocating driving dog and a rotatable ratchet wheel, said dog being driven from said driving shaft and being arranged and normally tending to engage and rotate said ratchet wheel, a manually controlled arm extending within said casing and arranged to be moved into and out of a position to engage said driving dog to move it out of the line of said ratchet wheel and to guide it in a plane of reciprocation out of the line of ratchet wheel engagement and actuation while permitting the continued reciprocation of said dog, and means coöperating with said arm to retain it in its dog controlling and non-controlling positions.

5. In a device of the character described, in combination, speed registering means, distance registering means, a separate gearing mechanism for each of said registering means, a common driving shaft for said mechanisms in permanent driving relation therewith, the gearing mechanism for one of said registering means including a rotatable gear element and a reciprocating actuator normally positioned and tending to engage and rotate said element, said actuator being in permanent operative connection with said common driving shaft, and manually controlled means arranged to position and guide said actuator in a plane of reciprocation out of the line of gear element engagement and actuation and without blocking the continued reciprocation of said actuator.

6. In a device of the character described, in combination, speed registering means, distance registering means, a separate gearing mechanism for operating each of said registering means, a common driving shaft for said gearing mechanisms in permanent driving relation therewith, the gearing mechanism for said distance registering means including a ratchet wheel and a reciprocating driving dog therefor arranged and normally tending to engage and rotate said ratchet wheel and in permanent driving relation to said common driving shaft, and manually controlled means arranged to be operated to position and guide said dog in a plane of reciprocation out of the line of ratchet wheel engagement and rotation and without blocking the continued reciprocation of said driving dog.

7. In a device of the character described, in combination, speed registering means, distance registering means, a separate gearing mechanism for operating each of said registering means, a common driving shaft for said gearing mechanisms in permanent driving relation therewith, the gearing mechanism for said distance registering means including a ratchet wheel and a reciprocating driving dog therefor arranged and normally tending to engage and rotate said ratchet wheel and in permanent driving relation to said common driving shaft, and manually controlled means arranged to be operated to position and guide said dog in a plane of reciprocation out of the line of ratchet wheel engagement and rotation and without blocking the continued reciprocation of said driving dog, and locking means for holding said manually controlled means in operative and inoperative guiding relation to said driving dog.

8. In a device of the character described, in combination, speed registering means, distance registering means, a separate gearing mechanism for operating each of said registering means, a common driving shaft for said gearing mechanisms in permanent driving relation therewith, the gearing mechanism for said distance registering means including a ratchet wheel and a reciprocating driving dog therefor arranged and normally tending to engage and rotate said ratchet wheel and in permanent driving relation to said common driving shaft, a manually controlled arm arranged to be moved to engage said dog to move it out of engagement with said ratchet wheel and to guide it in a plane of reciprocation out of the line of ratchet wheel engagement and actuation and without blocking the continued reciprocation of said dog, and means normally tending to hold said arm in dog guiding position when so moved.

9. In a device of the character described, in combination, a casing, a speed registering means mounted therein, distance registering means mounted therein, separate gearing mechanisms for operating each of said registering means, a driving shaft common to said gearing mechanisms and in permanent driving relation thereto, the gearing mechanism for said distance registering means including a ratchet wheel and a reciprocating driving dog arranged to engage and move said ratchet wheel to operate said distance registering means, said dog being in permanent operative connection with said common driving shaft, and a movable arm carried by said casing and arranged in one direction of movement to engage and move said dog to guide it in a plane of reciprocation out of the line of ratchet wheel engagement and actuation and without blocking the continued reciprocation of said dog, with means coöperating with said arm to hold it in said position when so moved.

10. In an instrument of the character described for use on a motor driven vehicle and arranged to be connected with and operated from the driven wheel thereof, and including a driven shaft, mechanism for counting the number of revolutions of said driven shaft, mechanism indicating the speed of revolution of said driven shaft, a common connection between both of said mechanisms and said driven shaft, and means for rendering inoperative the revolution counting means without affecting the operation of the speed indicating means.

11. In an instrument of the character described for use on a motor driven vehicle and arranged to be connected with and operated from the driven wheel thereof, and including a driven shaft, mechanism for counting the number of revolutions of said driven shaft, mechanism indicating the speed of revolution of said driven shaft, a common connection between both of said mechanisms and said driven shaft, and means included within and for rendering inoperative the revolution counting means without affecting the operation of the speed indicating means.

12. A speedometer-odometer having, in combination, a speed indicator, and an odometer, and driving means for the speed indicator and odometer having provision for stopping the odometer drive, substantially as described.

13. A speedometer-odometer having, in combination, a speed indicator having a speedometer spindle, an odometer, connections between the speedometer spindle and the odometer for driving the latter from the former and a throw-out for stopping the odometer drive, substantially as described.

CHARLES WALFRID SVENSON.

Witnesses:
GEO. P. SPEAR,
R. P. BROWN.

Copies of this patent may be obtained for five cents each, by addressing the "Commissioner of Patents, Washington, D. C."